(12) United States Patent
Komatsu et al.

(10) Patent No.: US 11,603,915 B1
(45) Date of Patent: Mar. 14, 2023

(54) DIFFERENTIAL

(71) Applicant: GKN Automotive Limited, Birmingham (GB)

(72) Inventors: Toshiaki Komatsu, Auburn Hills, MI (US); Kazuhiro Ohashi, Tochigi (JP); Chikashi Wakamatsu, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/403,972

(22) Filed: Aug. 17, 2021

(51) Int. Cl.
| | | |
|---|---|---|
| *F16H 48/24* | (2006.01) | |
| *F16H 48/34* | (2012.01) | |
| *F16H 48/08* | (2006.01) | |
| *F16H 48/40* | (2012.01) | |

(52) U.S. Cl.
CPC .......... *F16H 48/24* (2013.01); *F16H 48/08* (2013.01); *F16H 48/34* (2013.01); *F16H 48/40* (2013.01); *F16H 2048/346* (2013.01)

(58) Field of Classification Search
CPC .... F16H 48/34–2048/346; F16H 48/24; F16H 48/40
See application file for complete search history.

(56) References Cited

U.S. PATENT DOCUMENTS

| | | | |
|---|---|---|---|
| 8,287,417 B2 | 10/2012 | Sodou et al. | |
| 8,591,375 B2 * | 11/2013 | Maruyama | F16D 27/118 192/84.92 |
| 8,926,471 B2 * | 1/2015 | Yamanaka | F16H 48/22 74/606 R |
| 9,797,495 B2 * | 10/2017 | Inose | F16D 27/108 |
| 9,970,525 B2 * | 5/2018 | Zaers | F16H 48/08 |
| 10,711,849 B2 * | 7/2020 | Inose | F16H 48/32 |
| 11,142,067 B2 * | 10/2021 | Creech | B60K 23/04 |

FOREIGN PATENT DOCUMENTS

WO  WO-2019111294 A1 *  6/2019 ............ F16D 23/12

* cited by examiner

*Primary Examiner* — Ernesto A Suarez
*Assistant Examiner* — James J Taylor, II
(74) *Attorney, Agent, or Firm* — Bejin Bieneman PLC (57) ABSTRACT

A differential with a clutch is provided with: a differential gear set; a dividable casing defining a chamber accommodating the clutch and the differential gear set; a first member of the casing formed in a unitary body and including an end wall having a window penetrating the end wall, a boss portion projecting axially outward from the end wall, a side wall around the axis and a flange extending radially outward for receiving the torque; a second member of the casing fixed with the side wall to close the chamber; an axially movable clutch member axially movable including a leg portion disposed in the window and transmitting the torque from the end wall to the differential gear set; and an actuator having an axially outward offset from the flange and including a plunger abutting on the leg portion and driven axially by the actuator to thrust the clutch member.

4 Claims, 9 Drawing Sheets

DIFFERENTIAL

BACKGROUND

Technical Field

The disclosure herein relates to a differential with a clutch preferably applicable to a driveline in a motor vehicle, and in particular to a compact differential having sufficient rigidity.

Description of the Related Art

As right and left axles in a vehicle do not necessarily rotate in an equal speed, it is required to allow differential motion therebetween. To transmit torque to both the axles with enabling differential motion therebetween, a differential is used.

For the purpose of limiting or locking the differential motion, or for any other purpose, a differential may sometimes contain a clutch internally and may be combined with an external actuator for actuating the clutch. As the clutch within the differential is rotational whereas the actuator is anti-rotated, how these elements should be arranged and coupled always requires some technical attention.

U.S. Pat. No. 8,287,417 B2 discloses a differential combined with a solenoid as an actuator for actuating an internal clutch.

SUMMARY

Addition of the actuator is in itself unfavorable in light of pursuit of compactness, of course. Not only that, the present inventors had given more attention to adverse effect on rigidity produced by a structure necessitated by combination of the anti-rotated actuator with the rotational clutch because it in turn necessitates reinforcement and stiffening and consequently leads to size increase.

According to an aspect, a differential with a clutch is provided with: a differential gear set configured to differentially transmit torque to a pair of output gears; a casing rotatable about an axis and defining a chamber so dimensioned as to accommodate the clutch and the differential gear set, the casing being axially dividable into at least a first member and a second member; the first member formed in a unitary body and including an end wall having a window penetrating the end wall, a boss portion projecting axially outward from the end wall, a side wall around the axis and a flange extending radially outward for receiving the torque; the second member fixed with the side wall to close the chamber; a clutch member axially movable between a first position and a second position and including a leg portion disposed in the window and at the second position transmitting the torque from the end wall to the differential gear set; and an actuator installed on and coaxial with the boss portion of the first member and having an axially outward offset from the flange, the actuator having a plunger abutting on the leg portion and driven axially by the actuator to thrust the clutch member from the first position to the second position.

DESCRIPTION OF EXEMPLARY EMBODIMENTS

Exemplary embodiments will be described hereinafter with reference to FIG. 1 through FIG. 9. These drawings are not necessarily scaled precisely and therefore it is particularly noted that dimensional relations among them are not limited to those illustrated therein.

Throughout the following description and the appended claims, an axis means a rotational axis of a differential and terms "inward" and "outward" respectively mean "toward" and "away from" the interior of a casing of the differential unless otherwise described.

The respective embodiments described hereafter are directed to a so-called "lock-up differential" in which a clutch is used for locking differential motion, whereas the same is also applicable to a so-called "free-running differential" in which a clutch is used for switching torque transmission to axles on/off.

Referring mainly to FIGS. 1-4, a differential according to an embodiment is provided with a casing 1 that receives torque from an engine, an electric motor or such and thereby rotates about an axis X. The casing 1 is axially dividable into at least two members, namely a main body 1A and a cover body 1B. The casing 1 is further provided with boss portions 45A, 45B by which the casing 1 is rotatably supported by a not-shown carrier. The boss portion 45A is axially extended from the main body 1A and the boss portion 45B is axially extended from the cover body 1B.

The differential is further provided with a differential gear set 11 for differentially transmitting the torque to a pair of side gears 23A, 23B. The casing 1 accommodates the differential gear set 11 along with a clutch member 13. Structures adapted for a clutch, such as clutch teeth, are respectively formed on the back face of the side gear 23B and a corresponding face of the clutch member 13. This clutch, corresponding to its disconnection and connection, enables and disables differential motion between the side gears 23A, 23B. The clutch teeth are, meanwhile, formed on an inner casing for supporting the differential gear set 11 in place of the side gear in a case where it is applied to a free-running differential as described above. The clutch in this case releases and connects the differential gear set 11 from and to the engine/motor.

Figure 5:
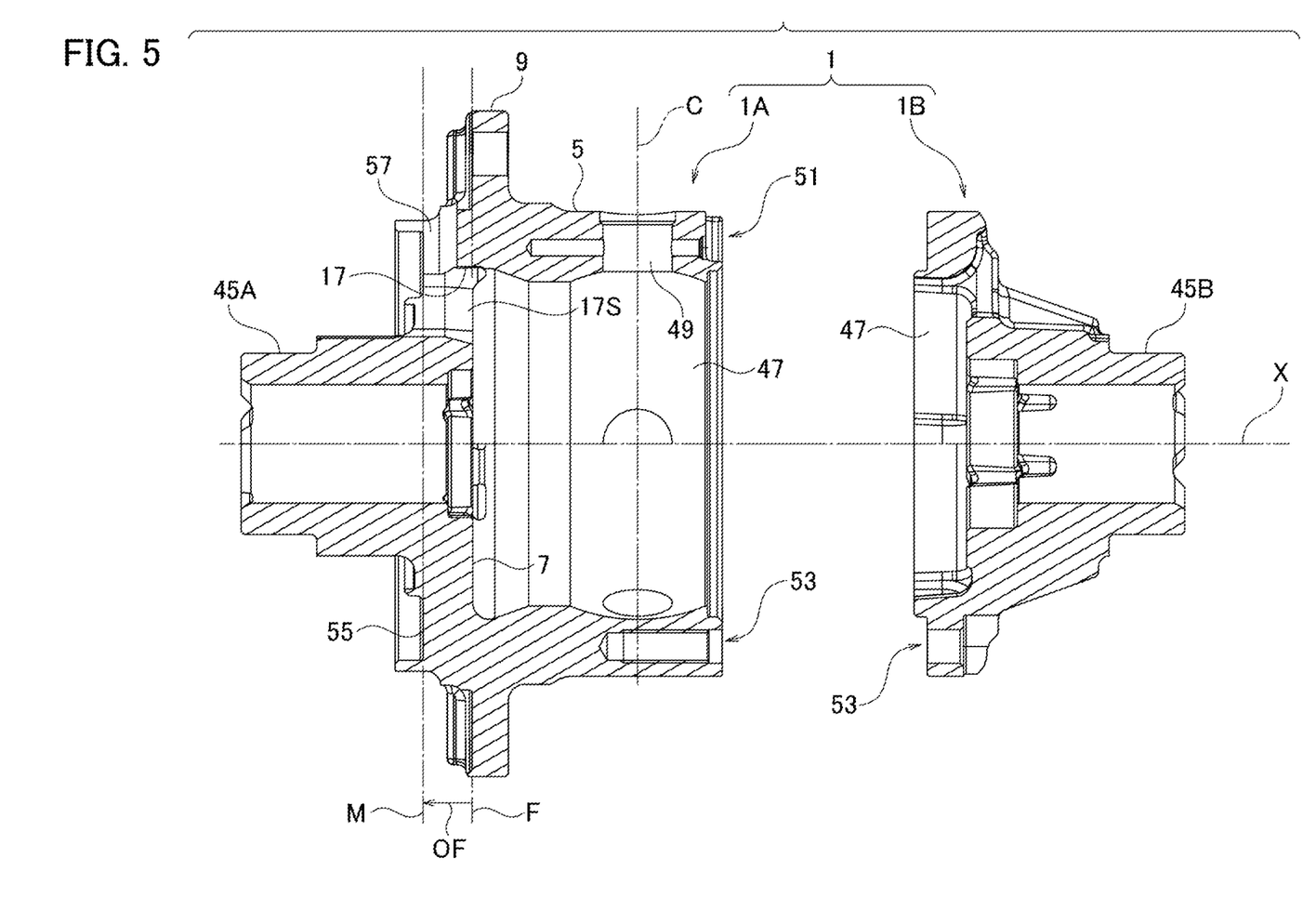
FIG. 5 is a sectional view of a casing, drawn as an exploded view.

Referring to FIG. 5 in combination with FIGS. 1-4, the casing 1 defines a chamber 47 for housing the gear set 11 and the clutch member 13. The cover body 1B is fixed by plural bolts 41 for example with the main body 1A but is separable therefrom to expose the chamber 47 to the exterior when internal members are to be installed therein. Although these bodies 1A, 1B may be divided around the center, around a pinion axis C for example, the line of division is preferably kept away from the center. More specifically, the main body 1A is preferably elongated as compared with the cover body 1B. The main body 1A is thus formed like as a deep bowl while the cover body 1B as a shallow pan, and therefore the main body 1A alone supports pinion shafts 27 as described later.

The main body 1A is generally composed of, but not limited to, a side wall 5 around the axis X, an end wall 7 as one end and a flange 9, the whole of which are formed in a unitary body. The combination of the side wall 5, the end wall 7 and the cover body 1B mainly defines the chamber 47. The flange 9 extends radially outward from the main body 1A and is coupled with any gearing structure such as a ring gear, which is used for receiving the torque.

The side wall 5 generally forms a cylinder or a cylindrical shape around the axis X. The side wall 5 has openings 49 so dimensioned as to receive the pinion shafts 27. The openings 49 are oriented in radial directions relative to the axis X and may penetrate the side wall 5 from the external face to the internal face for ease of installation of the pinion shafts 27. It is noted that the side wall 5 alone bears support of the pinion shafts 27 while the other portions of the main body 1A and as well the cover body 1B do not. In other words, only a limited portion from the flange 9 to the openings 49 bears torque transmission when the clutch is in a disconnected state. The other portions are unnecessary to be formed bulky for stiffening and reinforcement. This structure is beneficial in size reduction of the device as a whole.

Figure 1:
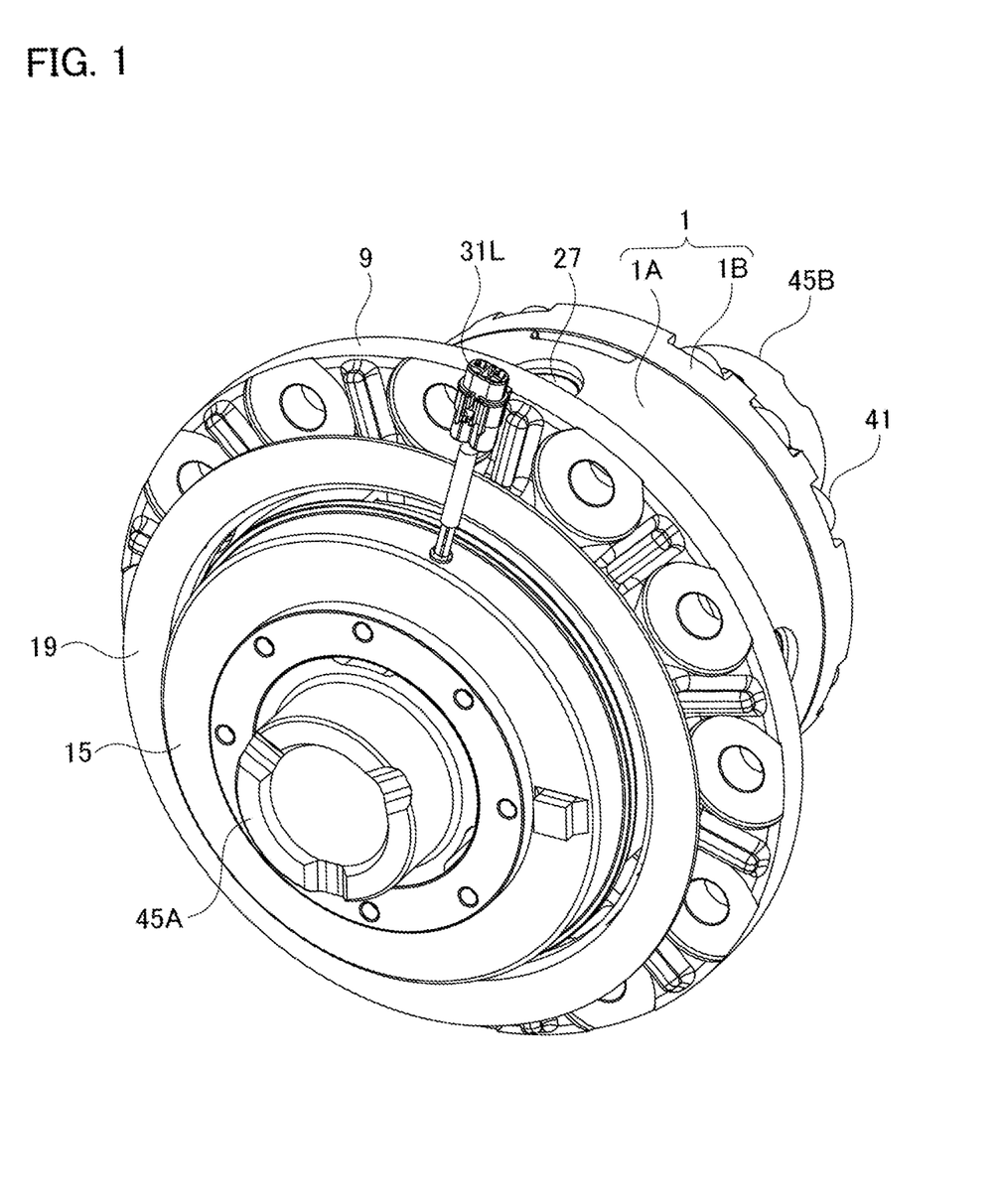
FIG. 1 is a perspective view of a differential.
Figure 2:
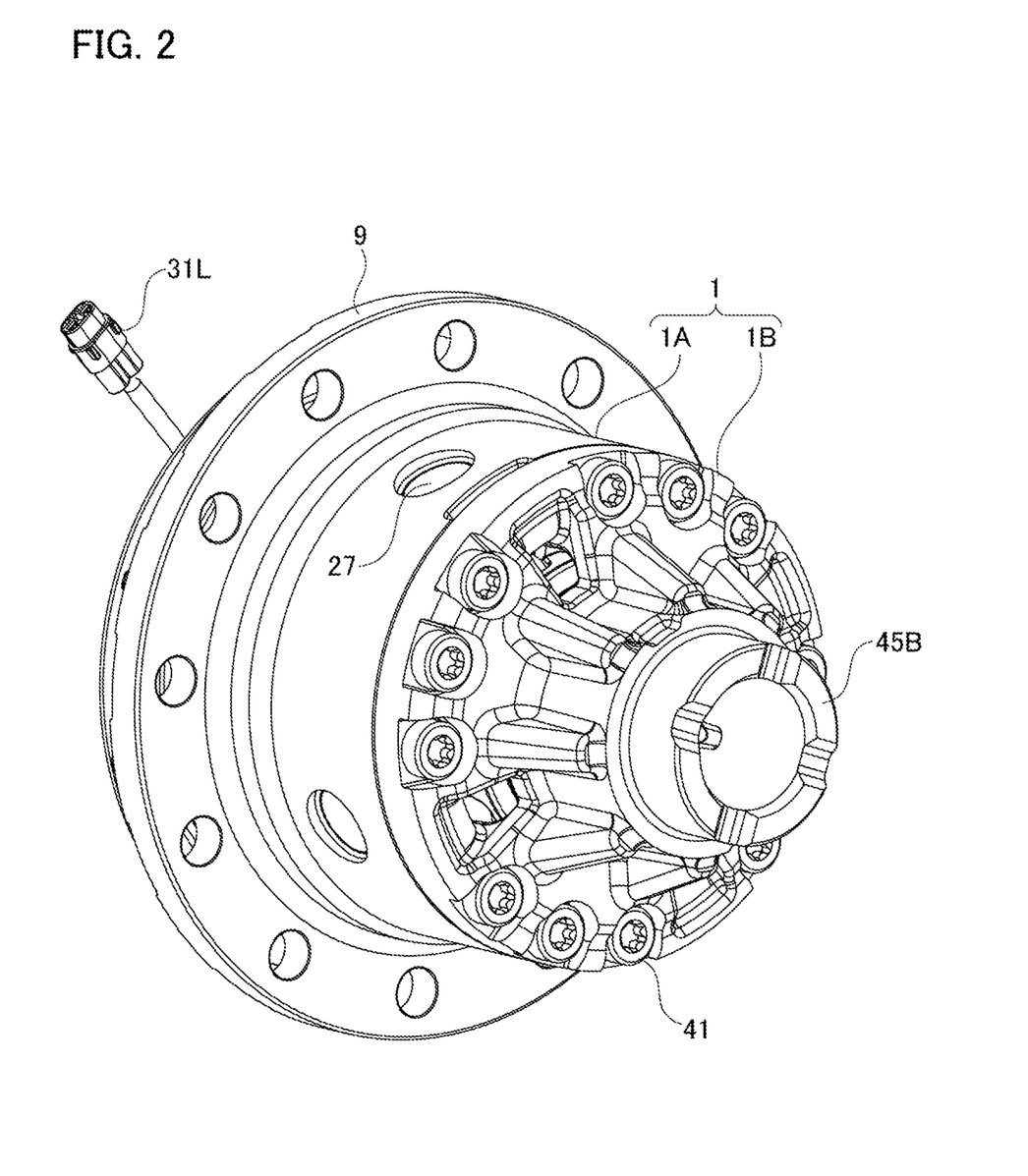
FIG. 2 is another perspective view of the differential.
Figure 3:
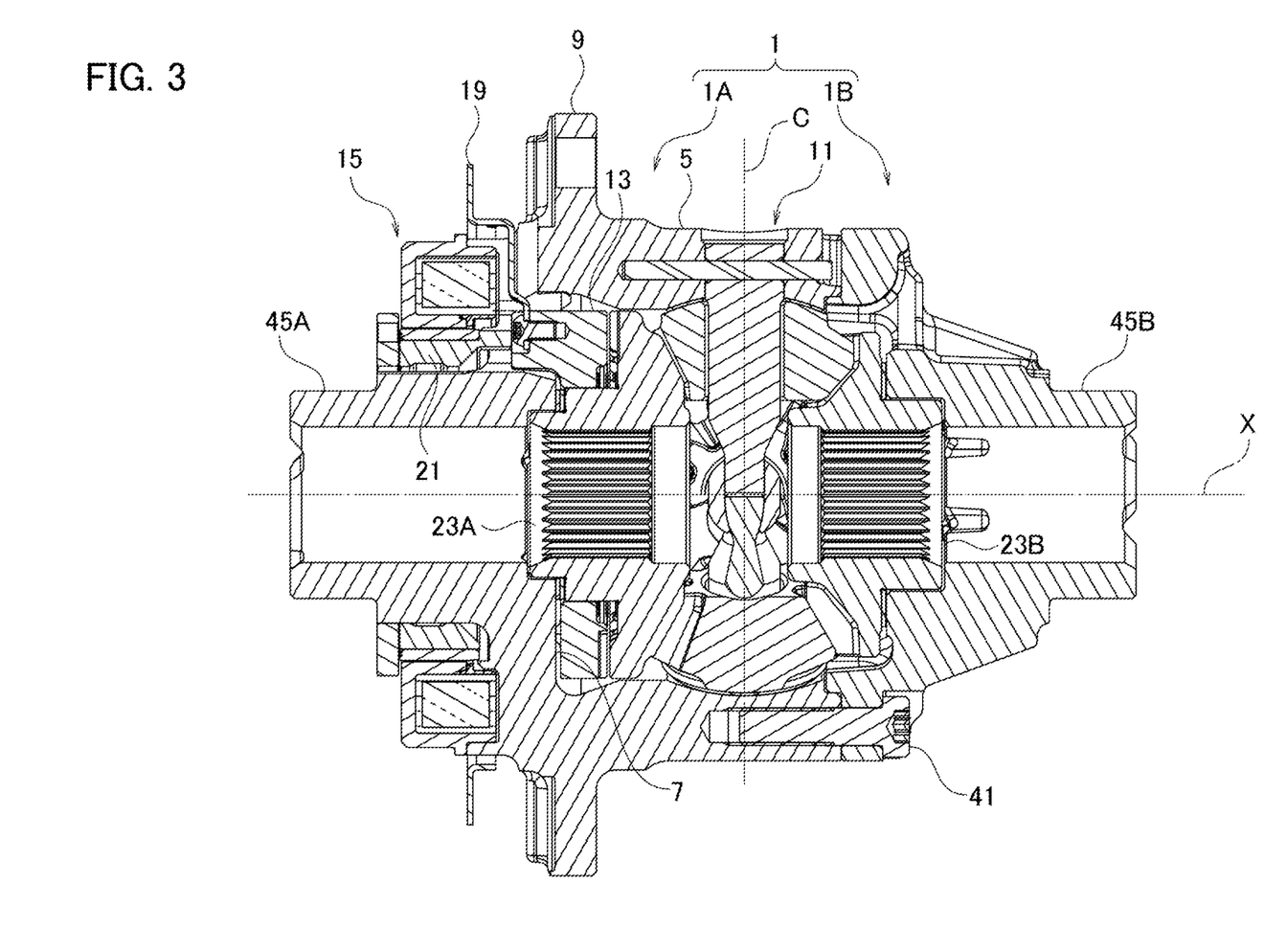
FIG. 3 is a sectional view of the differential, taken from a line of FIG. 4.
Figure 4:
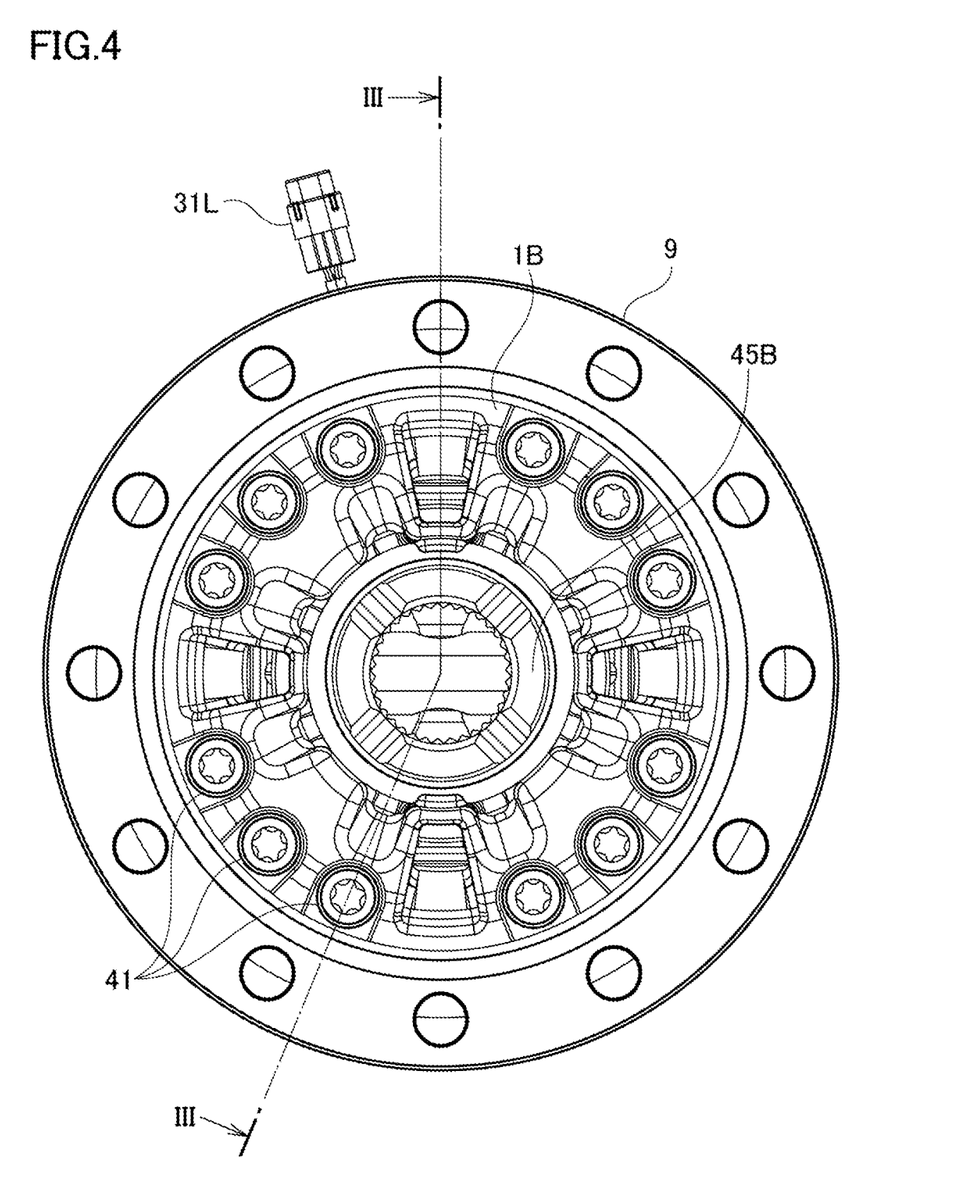
FIG. 4 is a side view of the differential, viewed from an end having a cover body.

The side wall 5 may further have bores 51 for receiving pins used for retaining the pinion shafts 27 and bolt holes 53 in which the bolts 41 are tightened. Both preferably extend in the axial direction and open on the end face opposed to the cover body 1B. The bores 51 and the holes 53 are, in the circumferential direction around the axis X, arranged alternately as maybe best understood from FIG. 4. The bolts holes 53 may thus extend from the end face beyond the openings 49 in a view perpendicular to the axis X as shown in FIG. 5 and nevertheless do not weaken the structure around the openings 49. Heads of the bolts 41 could be disposed closer to the openings 49 as shown in FIG. 3. This is beneficial in reduction in size, particularly lateral size from the shoulder to the flange of the casing 1.

The end wall 7 stands generally perpendicular to the axis X and thus forms a bottom of the bowl formed by the main body 1A. The end wall 7 is, however, provided with a bore at its center and a plurality of windows 17 arranged around the center. The boss portion 45A extended from the end wall 7 surrounds the central bore and one of axles is to pass therethrough. The windows 17 are used for coupling the actuator 15 with the clutch member 13 and also torque transmission to the clutch member 13 as described later.

The flange 9 is inherently perpendicular to the axis X and extends radially outward for coupling with a ring gear or such. The flange 9 is as described above formed in a unitary body with the side wall 5 and the end wall 7. Lack of any joint in and among these portions is beneficial in increasing strength and stiffness, and consequently leads to size reduction of the device as a whole.

The flange 9 may be disposed anywhere on the side wall 5, particularly anywhere between the openings 49 and the end wall 7, but may be preferably disposed as close to the end wall 7 as possible. The end wall 7 may thus be disposed just radially inside of, or overlap with, the flange 9. An external face 55 of the end wall 7 may nevertheless rise axially outward to provide the end wall 7 with a sufficient thickness. Such a structural relation among the flange 9, the end wall 7 and the external face 55 thereof improves structural resistance to the applied torque. The external face 55 may, as described later, receive and retain the actuator 15 in place. A plane M where the external face 55 receives the actuator 15 may have an axially outward offset OF from a flange plane F defined as an axially outermost face of the flange 9, as shown in FIG. 5.

Figure 9:
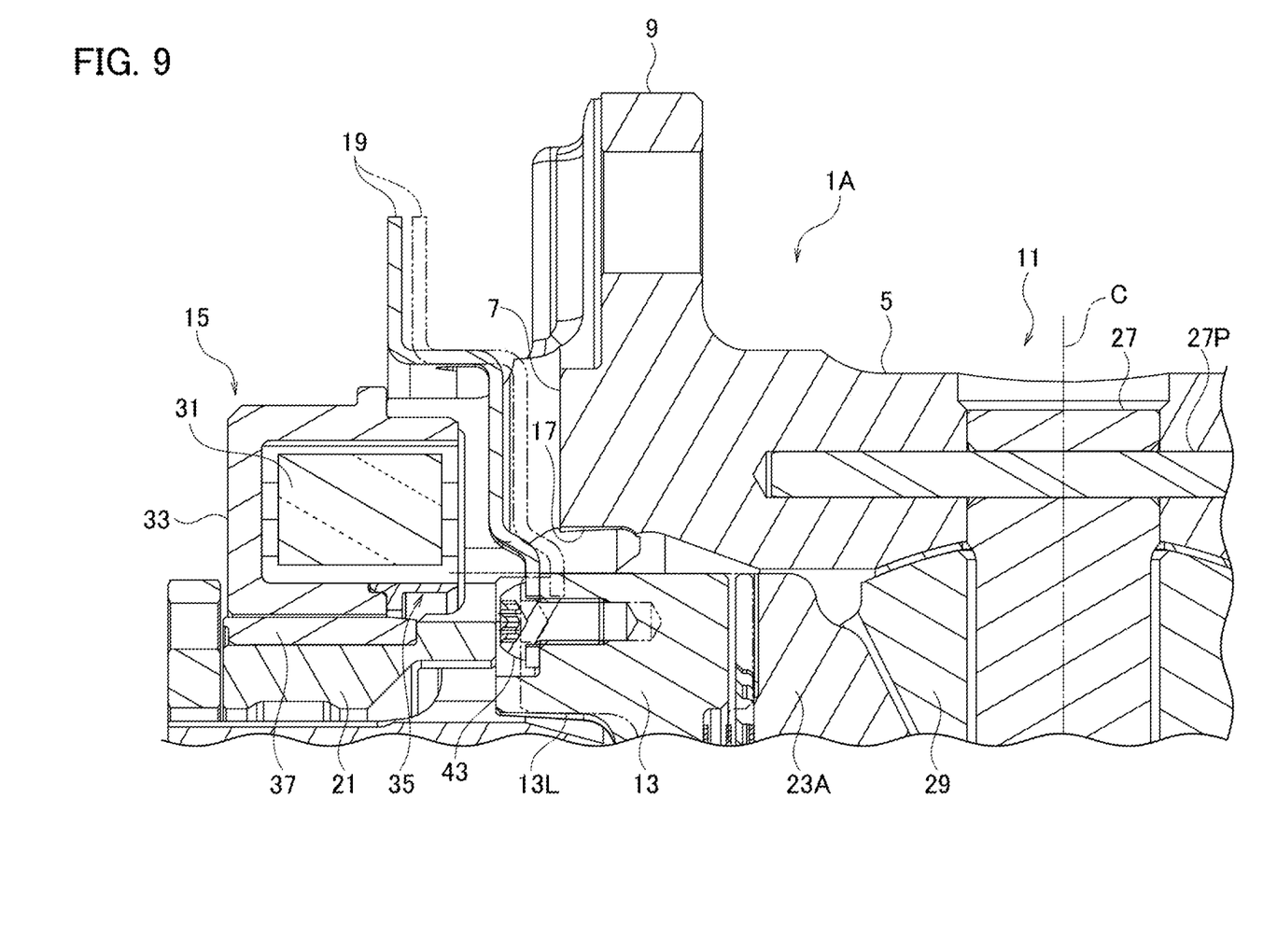
FIG. 9 is an enlarged elevational sectional view of the differential, which mainly shows the clutch member and elements therearound.

Referring to FIG. 9 in combination with FIGS. 3 and 5, the differential gear set 11 may be, but not limited to, a bevel gear type generally composed of pinions 29 rotatably supported by pinion shafts 27 and a pair of side gears 23A, 23B in mesh with the pinions 29. Of course, a face gear type or any other type is instead applicable thereto. The pinion shafts 27 are inserted in the openings 49 and, by pins 27P transversely inserted therein, secured to the side wall 5. The pinion shafts 27 receive the torque about the axis X and the pinions 29 rotatable about the pinion axis C transmit the torque to both the side gears 23A, 23B. The differential gear set 11 thus differentially transmits the applied torque to the side gears 23A, 23B with allowing differential motion therebetween.

Each of the side gears 23A, 23B is a hollow gear so formed as to mesh with the pinions 29 and has splines or any structure for coupling with the axle. The side gear 23A at the side of the flange 9 is provided with an engagement structure such as dog teeth for meshing with the clutch member 13. The clutch composed of the side gear 23A and the clutch member 13 in the connected state restricts differential motion between the side gears 23A, 23B.

Figure 8:
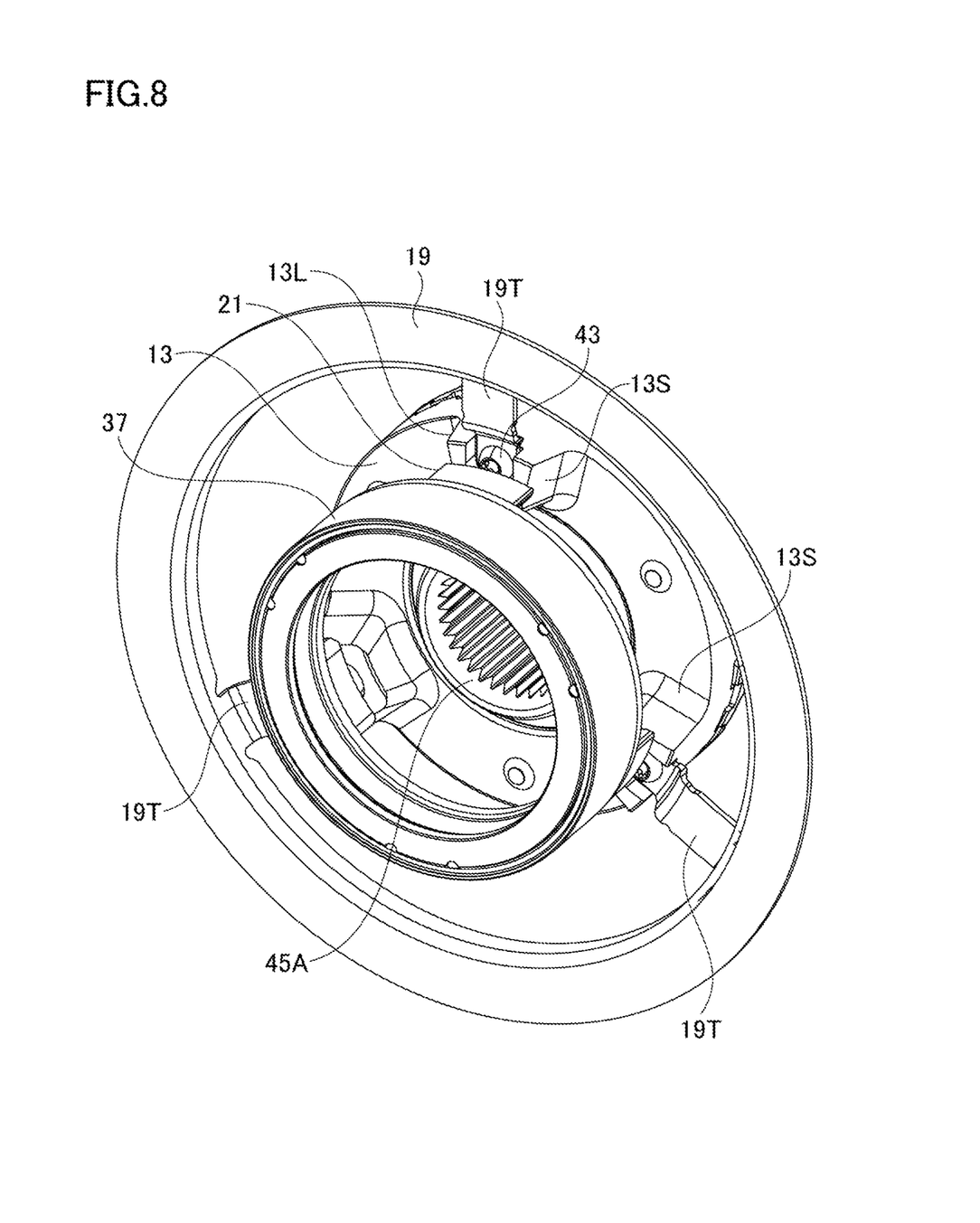
FIG. 8 is a perspective view of a clutch member, a side gear in mesh with the clutch member, the ring plate and a plunger.

Referring to FIG. 8 in combination with FIGS. 3 and 9 for example, the clutch member 13 is generally formed in a shape of a somewhat bulky ring. The clutch member 13 is provided with a plurality of leg portions 13L projecting axially outward according to the windows 17 and, on the opposite face, any engagement structure such as dog teeth corresponding to those of the side gear 23A. While the clutch member 13 is held between the end wall 7 and the side gear 23A, some motion in the axial direction is allowed so as to mesh with and depart from the side gear 23A.

The leg portions 13L are respectively disposed in the windows 17 and these ends are exposed to the exterior of the end wall 7 through the windows 17. Respective side faces 13S of the leg portions 13L are so dimensioned as to abut on the side faces 17S of the windows 17. The clutch member 13 thus receives and transmits the torque from the end wall 7 to the side gear 23A when the clutch is in the connected state.

The actuator 15 may be any driver means such as a solenoid, a hydraulic cylinder, a pneumatic cylinder, or a motor cylinder formed in a cylindrical shape, which axially thrusts the ends of the leg portions 13L exposed through the windows 17. In a case of the solenoid, the actuator 15 is provided with an electromagnetic coil 31 with a cable 31L led out thereof and a core 33 for guiding a magnetic flux generated by the coil 31 for example.

The actuator 15 may be provided with a cylindrical plunger 21 for transmitting its driving force to the clutch member 13, whereas the actuator 15 by itself axially moves to thrust the clutch member 13. The differential may be provided with a repulsive body such as a spring to set back the clutch to the disconnected state, which may be repulsively interposed between the side gear 23A and the clutch member 13 for example. Of course, the actuator 15 may be instead used to draw the clutch member 13 and the repulsive body may be used to set the clutch into the connected state.

In a case where the actuator 15 is a solenoid, the plunger 21 may be generally made of any non-magnetic material such as a stainless steel, any aluminum alloy or any engineering plastic in order to prevent magnetic flux leakage but may include a magnetic part 37 made of any magnetic material such as a low-carbon steel so disposed as to face the electromagnetic coil, thereby being magnetically driven by the solenoid.

The actuator 15 is disposed close to, or in contact with, the external face 55 of the end wall 7 and coaxial with the boss portion 45A. The actuator 15 thus has an axially outward offset relative to the flange 9 as being corresponding to the offset OF of the external face 55. Preferably the actuator 15 slidably fits on the boss portion 45A. As the actuator 15 is disposed so, the dimensions of the differential could be reduced.

Figure 6:
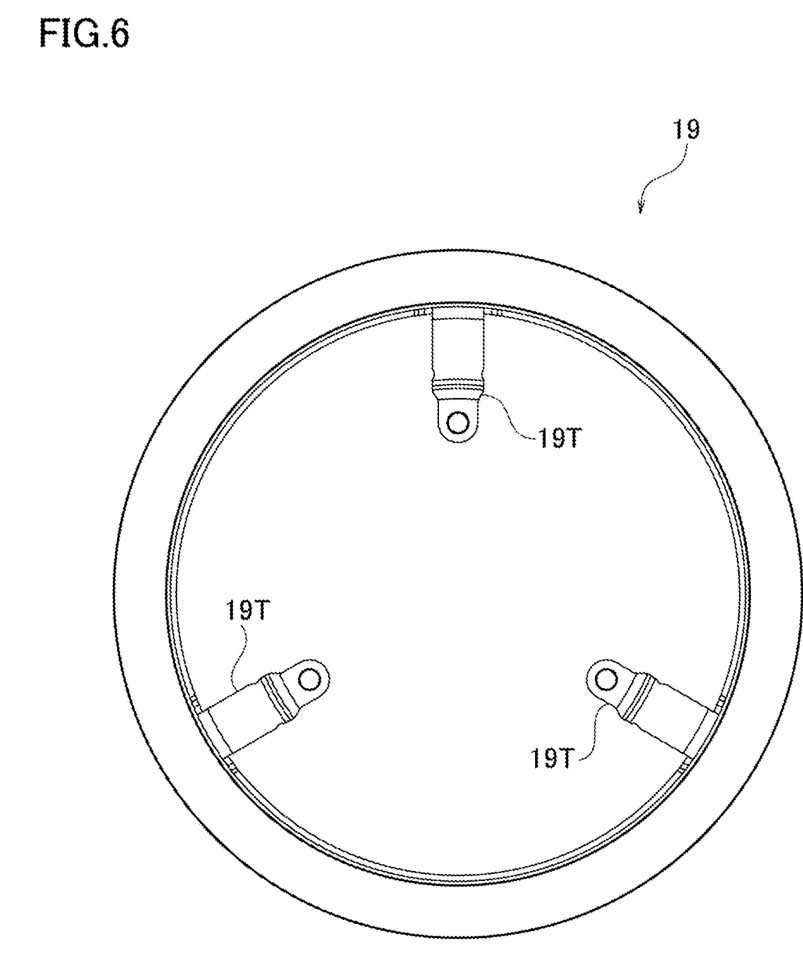
FIG. 6 is a side view of a ring plate.

Referring to FIG. 6 in combination with FIGS. 1, 3 and 7 through 9, the differential is further provided with a ring plate 19 usable for detecting whether the clutch is connected or disconnected. The ring plate 19 is generally a ring coaxial with the axis X and has a plurality of, three for example, tab portions 19T for fixation to the leg portions 13L. The tab portions 19T are respectively secured to the leg portions 13L by means of bolts 43, rivets or any other fixation means. The tab portion 19T may be instead secured to the plunger 21.

Figure 7:
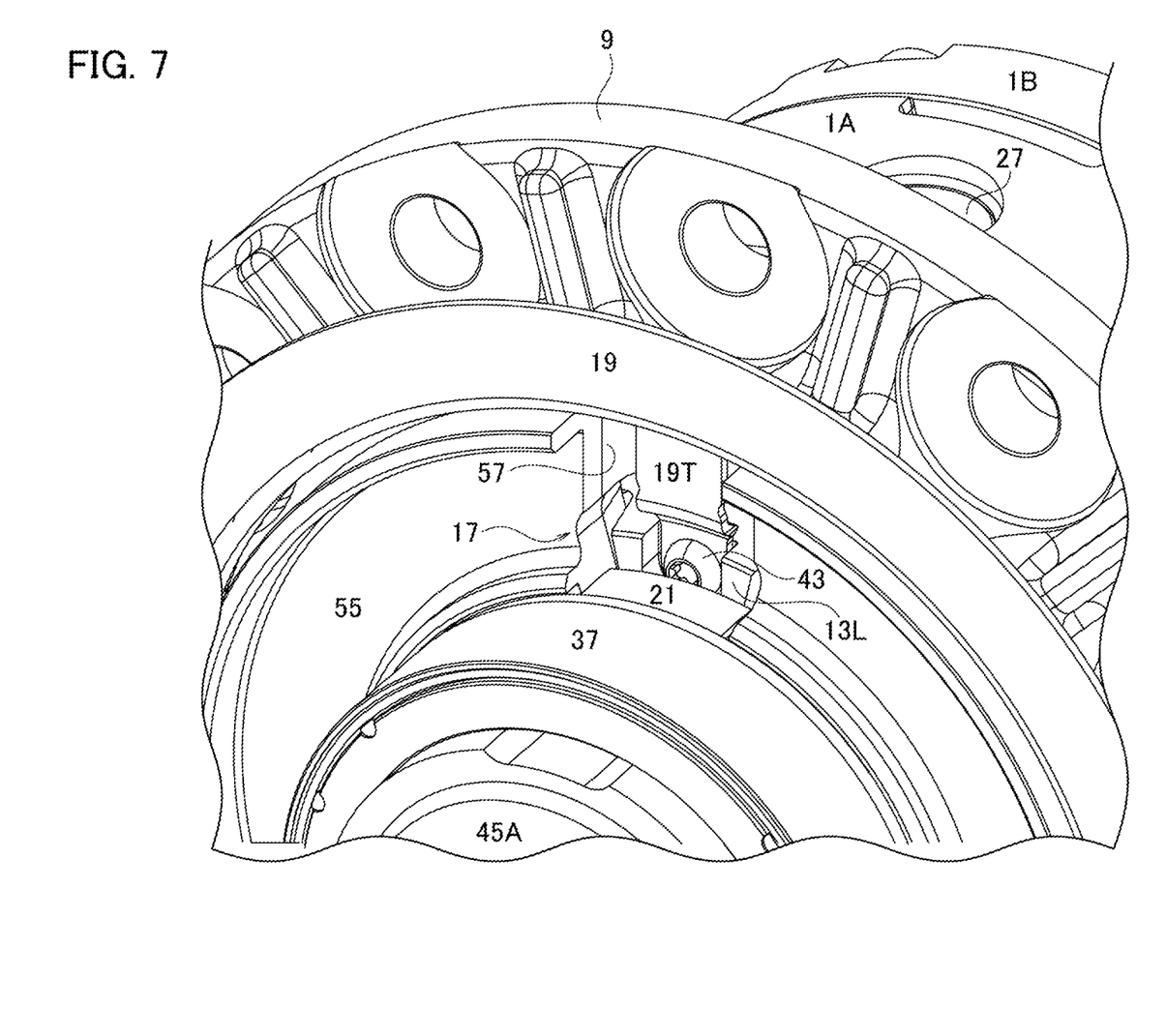
FIG. 7 is an enlarged perspective view of the differential, which mainly shows a window and elements therearound and omits a solenoid.

The external face 55 of the end wall 7 may be flat at least in the range where the actuator 15 is in contact therewith, whereas the end wall 7 may include notches 57 through which the tab portions 19T are led out, as best shown in FIG. 7. The notches 57, nevertheless, hardly produce adverse effects on the structural rigidity against the applied torque as they are sufficiently narrow.

The notches 57 leave sufficient gaps for allowing the tab portions 19T to move in the axial direction and therefore follow motion of the clutch member 13. Therefore, as the ring plate 19 indicates positions of the clutch member 13 to the exterior, whether the clutch is in the connected state or the disconnected state can be detected from the exterior. As well, the ring plate 19 may be simultaneously used for rotational speed detection because the ring plate 19 rotates along with the differential.

As will be readily understood from the above descriptions, the torque input through the flange 9 spreads only limited areas in the casing 1. The torque flow could be expressed as two paths. In the first path, typically established in the disconnected state, the torque is routed from the flange 9 through a limited portion of the side wall 5 to the pinion shafts 27. In the second path, established only in the connected state, the torque is further routed from the flange 9 through the end wall 7 to the clutch member 13. As the cover body 1B and the bolts 41 are steadily out of these paths, these members could be reduced in size without loss of structural strength and rigidity. Moreover the second path could have a sufficient torsional rigidity although it is compact, mainly because of the particular relation among the flange 9, the end wall 7 and the external face 55 thereof as described already.

Although certain exemplary embodiments are described above, modifications and variations of the embodiments will occur to those skilled in the art, in light of the above teachings.

What is claimed is:

1. A differential with a clutch, comprising:
a differential gear set configured to differentially transmit torque to a pair of output gears;
a casing rotatable about an axis and defining a chamber so dimensioned as to accommodate the clutch and the differential gear set, the casing being axially dividable into at least a first member and a second member;
the first member formed in a unitary body and including an end wall having a window penetrating the end wall, a boss portion projecting axially outward from the end wall, a side wall around the axis and a flange extending radially outward for receiving the torque;
the second member fixed with the side wall to close the chamber;
a clutch member axially movable between a first position and a second position and including a leg portion disposed in the window and at the second position transmitting the torque from the end wall to the differential gear set, wherein the clutch member includes a dog clutch; and
an actuator installed on and coaxial with the boss portion of the first member and having an axially outward offset from the flange, the actuator having a plunger abutting on the leg portion and driven axially by the actuator to thrust the clutch member from the first position to the second position, wherein the actuator includes a solenoid;
wherein the end wall overlaps with the flange and includes an external face projecting axially outward from, and not overlapping axially with, the flange and receiving the actuator; and
wherein the external face is at least partly in contact with the actuator and the end wall includes a notch to leave a gap between the external face and the actuator.

2. The differential of claim 1, further comprising:
a ring plate fixed with the leg portion to follow motion of the clutch member and led out through the gap.

3. The differential of claim 1, wherein the actuator slidably fits on the boss portion of the first member.

4. The differential of claim 1, wherein the flange axially overlaps with the clutch member.

* * * * *